June 8, 1948. H. N. BLISS 2,443,064
INDICATING COUNTER
Filed Aug. 31, 1945 3 Sheets-Sheet 1
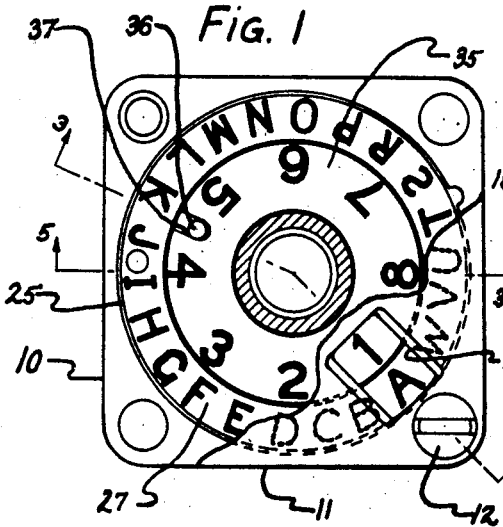
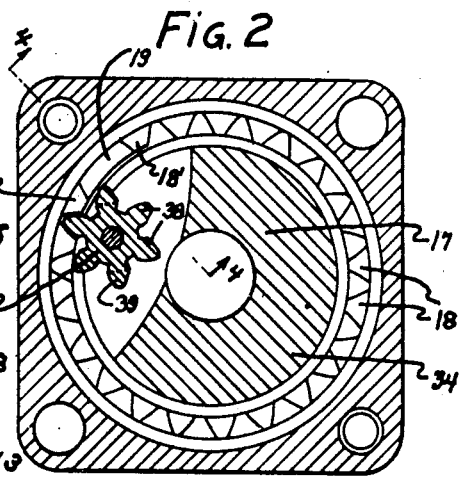
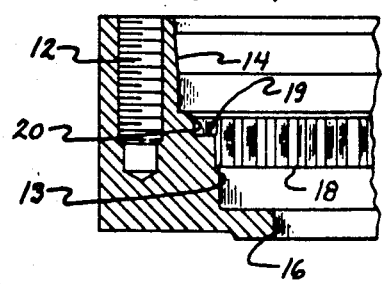
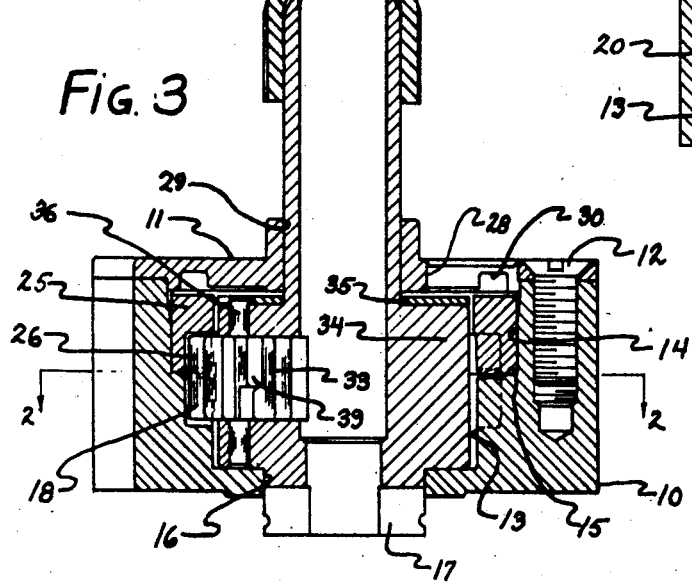
HARVEY N. BLISS Inventor
By Lindsey and Robillard
Attorney June 8, 1948. H. N. BLISS 2,443,064
INDICATING COUNTER
Filed Aug. 31, 1945 3 Sheets-Sheet 2

HARVEY N. BLISS Inventor

By Lindsey and Robillard
Attorney

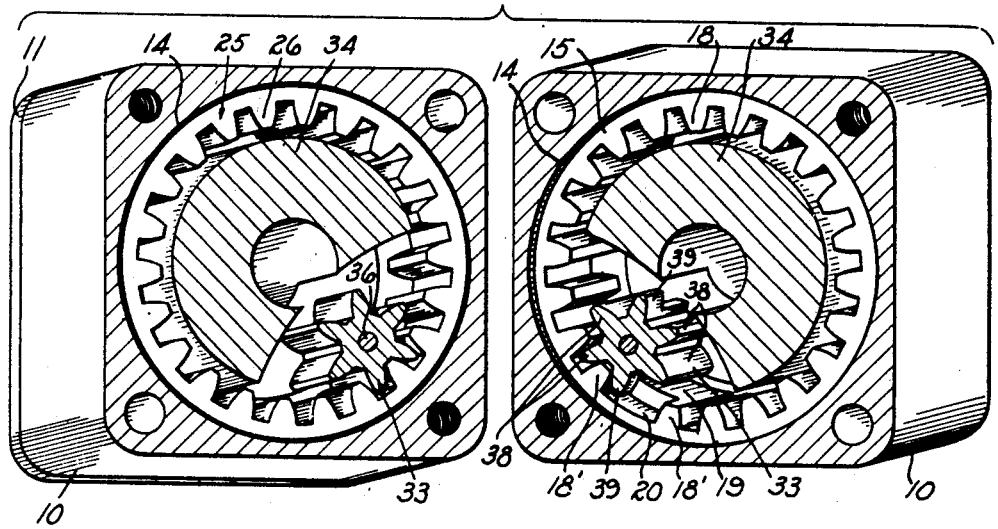

Patented June 8, 1948

2,443,064

UNITED STATES PATENT OFFICE 2,443,064

INDICATING COUNTER

Harvey N. Bliss, Windsor, Conn., assignor to Veeder-Root Incorporated, Hartford, Conn., a corporation of Connecticut Application August 31, 1945, Serial No. 613,777

5 Claims. (Cl. 116—133)

1

The present invention relates to an indicating device or counter having two indicating members with transfer means therebetween. While the device constructed in accordance with the present invention may have various applications and uses, reference may be had, in the present instance, to its application to a radio set such as the so-called walkie-talkie set now commonly employed by the armed services. In such a set, the device may be employed in connection with the tuning instrumentality, such as the condenser, for indicating the setting thereof in accordance with the desired stations with which communication is desired to be established.

An aim of the present invention is to provide an improved indicator counter having various features of novelty and advantage and which is particularly characterized by its extremely small size, its economy in manufacture, the ease and facility with which the parts may be assembled; its rugged construction, precluding the possibility of getting out of order; and the ease and facility with which it may be operated.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Figure 1 is a top plan view of the device with part of the cover cut away;

Fig. 2 is a horizontal sectional view thereof taken on line 2—2 of Fig. 3;

Fig. 3 is a vertical sectional view taken on line 3—3 of Fig. 1;

Fig. 4 is a partial sectional view of the case taken on line 4—4 of Fig. 2;

Fig. 10 is a perspective view of the device which has been separated along the line 2—2 of Fig. 3 to show the top and bottom horizontal sections, the top section (at the left of the view) showing the

Figure 5:
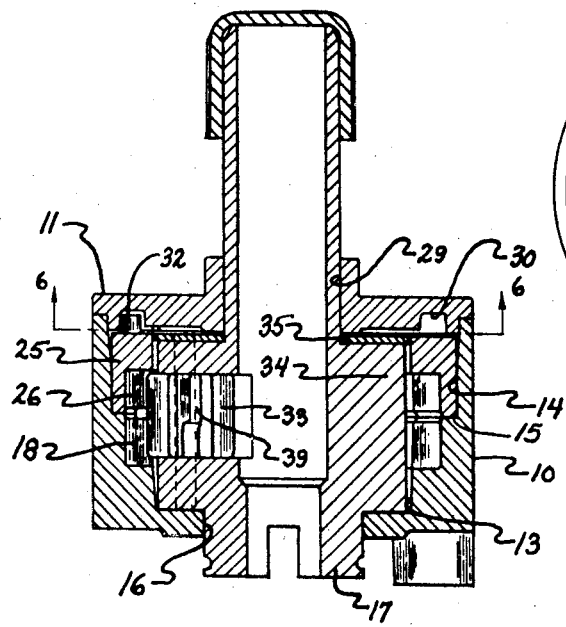
Fig. 5 is a view similar to Fig. 3 but taken on line 5—5 of Fig. 1.

2 top portion of the transfer pinion engaging the letter ring or ring of higher order and the bottom section (at the right) showing the lower portion of the transfer pinion leaving the cam.

Referring to the drawings, the device has a casing comprising a case or body portion 10 and a cover 11 secured to the case by screws 12. The case comprises an integral member or block chambered to provide a rear cylindrical recess 13 and a forward enlarged cylindrical bore 14 with an annular step 15 therebetween. The rear wall of the case has a concentric opening 16 which forms a bearing for the inner or rear end of a spindle 17. Provided in the forward portion of the cylindrical wall of the recess 13 is an internal annular gear 18 having equally spaced apart teeth, except that one of the teeth is omitted and in its place a locking shoulder 19 is provided, for the purpose described more in detail hereinafter. This locking shoulder is in the form of an arcuate surface extending between the teeth 18'—18' of the gear. The shoulder 19 is of slightly larger diameter than the internal diameter of the gear 18. Also, the shoulder stops short of the forward ends of the teeth of the gear, that is to say, the height of the shoulder is less than the length of the teeth so that a space or recess 20 is provided between the forward ends of the teeth 18', 18'.

Figure 7:
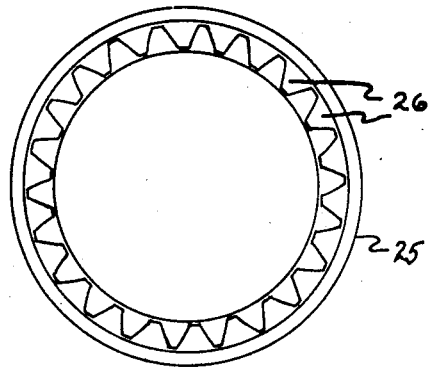
Fig. 7 is a bottom view of the letter ring or ring of the higher order.

The numeral 25 designates a ring which constitutes the counter member of higher order. This ring is rotatably mounted in the enlarged bore 14 of the case, and its inner end engages the step 15 thereof. The outside diameter of the ring is only slightly less than the diameter of the bore so that it rotatably fits therein and is maintained against lateral movement thereby. The internal diameter of the ring is substantially the same as the internal diameter of the recess 13 of the case. The ring has, at its rear end, an internal gear 26 which corresponds to the internal fixed gear 18 in that the teeth have the same pitch and circle, but differs in that the rotatable gear 26 is not mutilated as will be seen most clearly from Fig. 7. The forward face 27 of the ring is disposed at right angles to the axis of the spindle 17 and is provided with consecutively arranged figures which, in the present instance, are in the form of letters running from A to W in a counterclockwise direction as viewed from Fig. 1. These letters are successively brought into registry with a window 28 provided in the cover 11, which window is generally radially disposed with respect to the axis of the spindle.

Figure 6:
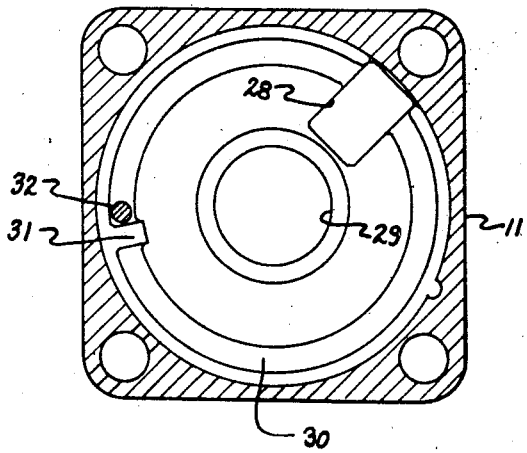
Fig. 6 is a sectional view taken on line 6—6 of Fig. 5, the cover being shown in bottom plan and the shaft being omitted.

The cover is provided with a central bearing 29 in which the spindle is journaled, this bearing being concentric with respect to the bearing 16 and the cylindrical recess 13 and the bore 14. The cover is provided on its rear face with an annular groove 30 which is interrupted by a rib or stop 31 (see Fig. 6). The ring gear 26 has a forwardly extending stud 32 which engages in this groove and which is adapted to engage the stop 31 in order to limit the extent of rotation of the ring gear. The spindle, which comprises the counter member of lower order, carries within the casing an eccentrically mounted transfer pinion 33 which meshes with the gears 18 and 26. In the present illustrative disclosure, the spindle is provided with an integral concentric cylindrical collar or enlargement 34, on the forward face of which is provided a series of consecutively arranged numbers which, in the present instance, run from 1 to 8 in a counterclockwise direction with reference to Fig. 1. These numerals are adapted to be brought consecutively into register with the window 29. In the present instance, these numerals are provided on an indicating disk 35 positioned against the forward face of the enlargement 34 and maintained in position for simultaneous rotation with the spindle by a pin 36 extending into a notch 37 of the disk. The inner or rear end of the enlargement engages against the rear wall of the case, and the rear face of the cover is closely adjacent to the forward ends of the enlargement and ring so that the ring and spindle are maintained against appreciable axial movement. The enlargement or collar is slotted at one side so as to accommodate the transfer pinion 33, and the pin 36, which extends through this slot, constitutes a bearing for the pinion.

In the present illustrative disclosure, the pinion is shown as having four long teeth 38 and two diametrically disposed short teeth 39, all of which mesh with the teeth of the gears 18 and 26. The rear ends of the short teeth stop short of the locking shoulder 19 so that, during a transfer operation, one of these teeth is accommodated by the space 20 while the long teeth to either side of the short teeth will be in position to engage the shoulder and the pinion at this time is restrained against rotation about the pin 36 with the result that the gear ring 26 will be advanced one step.

Figure 8:
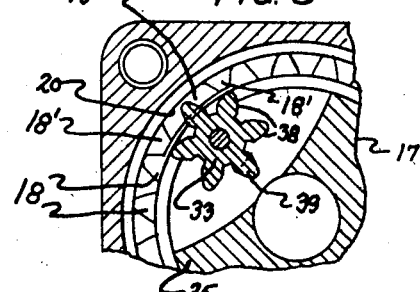
Fig. 8 is a view similar to Fig. 2 but showing the transfer pinion advanced onto the cam.
Figure 9:
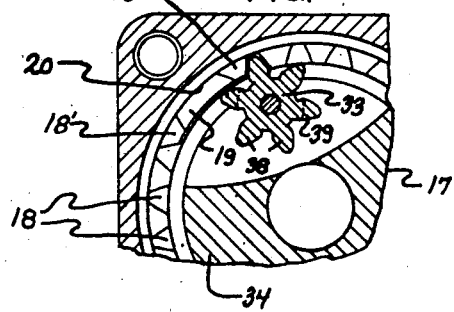
Fig. 9 is a partial sectional view showing the transfer pinion after leaving the cam.

From the foregoing arrangement, it will be seen that the spindle may be rotated in either direction and, when so rotated, the numerals of the disk 35 are consecutively brought into registry with the window 29. Further, when the spindle is rotated, the transfer pinion 33, except during the transfer operation, will mesh with the teeth of the fixed gear 18 and the ring gear 26 so that the pinion is caused to rotate by its engagement with the fixed gear, and the ring gear is maintained stationary. However, when the spindle is turned to a point where the pinion is brought into operative relation with the locking shoulder, the pinion will move from the position shown in Fig. 2 to that shown in Fig. 8 in which latter figure one of the short teeth 39 is accommodated by the space 20 and the two adjacent teeth extend across the locking shoulder 19 so that further rotation of the pinion in either direction would be prevented by engagement of one of the said adjacent teeth with the shoulder. The result is that the locking ring is advanced one step or until the pinion reaches the position shown in Fig. 10, whereupon the pinion again commences to rotate and comes into mesh with the teeth of the fixed gear 18 as shown in Fig. 9.

It is clear that the device is comparatively simple in operation and construction; the parts are easy to assemble and require no close tolerances in manufacture. The parts cannot become disarranged or get out of adjustment. The device can be made very small and, in fact, the present illustrative drawings are on a scale many times larger than that required when the device is used in connection with "walkie-talkie" radio equipment. The device is adaptable for manufacture in various sizes depending on the use to which the device is to be applied.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. An indicating counter comprising a casing, an integral internal annular gear in the casing and having a mutilated portion provided with a locking shoulder of lesser height than the length of the teeth of the gear, a spindle rotatably mounted in the casing and constituting a counter member of lower order, a counter member of higher order journaled in said casing about said spindle and having an internal annular gear coextensive with said first-mentioned gear, and a pinion within said casing eccentrically carried by said spindle and meshing with the teeth of both of said gears, said pinion having a short tooth stopping short of said shoulder and adapted to extend thereover during a transfer operation.

2. An indicating counter comprising a casing provided at one end with a window, an integral internal gear in said casing having a mutilated portion provided with a locking shoulder of lesser height than the length of the teeth of the gear, a spindle rotatably mounted in the casing and having a radially extending face provided with consecutively arranged figures adapted to be brought into registry with said window, a ring journaled in said casing and surrounding said spindle and having on its forward face consecutively arranged figures adapted to be brought into registry with said window, said ring having an internal gear coextensive with said first gear, and a rotatable transfer pinion eccentrically carried by said spindle and meshing with both of said gears, said pinion having a short tooth stopping short of said shoulder and arranged to extend thereover during a portion of the rotation of the spindle whereby to effect a transfer operation from the spindle to said ring gear.

3. An indicating counter comprising a casing provided at one end with a window, an integral internal gear in said casing, a spindle rotatably mounted in the casing and having a radially extending face provided with consecutively arranged figures adapted to be brought into registry with said window, a ring journaled in said casing and surrounding said spindle and having on its forward face consecutively arranged figures adapted to be brought into registry with said window, said ring having an internal gear coextensive with said first gear, and a rotatable transfer pinion eccentrically carried by said spindle and meshing with both of said gears, said pinion and first-mentioned gear being arranged to prevent rotation of the pinion about its axis during a portion of the rotation of the spindle whereby to effect a transfer operation from the spindle to said ring.

4. An indicating counter comprising a casing having an inner recess, an enlarged bore, and a step therebetween, the wall of said recess being provided with an internal gear, a ring constituting a counter member of higher order journaled in said enlarged bore and engaging at its inner end against said step, said ring having an internal gear coextensive with said first gear, a spindle journaled in said casing and constituting a counter member of lower order, and a rotatable transfer pinion eccentrically carried by said spindle and meshing with both of said gears, said pinion and first-mentioned gear being arranged to prevent rotation of the pinion about its axis during a portion of the rotation of the spindle whereby to effect a transfer operation from the spindle to said ring.

5. In an indicating counter, a case comprising a block having a rear wall provided with a bearing, an inner recess, and an enlarged bore with a step between the recess and the bore, said recess having in its wall an internal annular mutilated gear provided with a locking shoulder extending through the mutilated portion thereof, a cover closing the outer end of said case and having a central bearing concentric with said first bearing and a window, a ring constituting a counter member of high order journaled in said enlarged bore and positioned between said step and cover, said ring having an internal gear coextensive with said first gear, said ring having on its forward face consecutively arranged figures registrable with said window, a spindle journaled in said bearings and extending axially through said gears, said spindle having within said case and behind the cover a radially extending face provided with consecutively arranged figures adapted to be brought into registry with said window, and a rotatable transfer pinion eccentrically carried by said spindle and meshing with the teeth of both of said gears, said pinion having at least one short tooth non-engageable with said locking shoulder while the teeth to opposite sides thereof cooperate with said shoulder to positively lock the pinion against rotation and thereby effect a transfer operation.

HARVEY N. BLISS.